United States Patent [19]

DuLac et al.

[11] Patent Number: 4,866,601
[45] Date of Patent: Sep. 12, 1989

[54] DIGITAL DATA BUS ARCHITECTURE FOR COMPUTER DISK DRIVE CONTROLLER

[75] Inventors: Keith B. DuLac, Derby; Dennis E. Gates, Wichita, both of Kans.

[73] Assignee: NCR Corporation, Dayton, Ohio

[21] Appl. No.: 100,498

[22] Filed: Sep. 24, 1987

[51] Int. Cl.4 .................... G06F 13/12; G06F 13/20
[52] U.S. Cl. ................................ 364/200; 364/238.3; 364/239.2; 364/239.3; 364/236.2; 364/248.1; 364/262.8
[58] Field of Search .................. 364/200 MS, 900 MS

[56] References Cited

U.S. PATENT DOCUMENTS

| | | | |
|---|---|---|---|
| 4,025,906 | 5/1977 | Riikonev | 364/200 |
| 4,342,081 | 7/1982 | Dubuc . | |
| 4,651,237 | 3/1987 | Williams | 360/48 |
| 4,727,509 | 2/1988 | Johnson et al. | 364/900 |
| 4,773,036 | 9/1988 | Berons et al. | 364/900 |

*Primary Examiner*—Jerry Smith
*Assistant Examiner*—James J. Kulbaski
*Attorney, Agent, or Firm*—Wilbert Hawk, Jr.; Edward Dugas; Gregory P. Gadson

[57] ABSTRACT

A disk drive controller bus architecture for interfacing disk drives having widely varying data format requirements with small computer systems is comprised of a disk drive parameter storage section, a disk drive parameter compartor/interface section and a set of associated data buses, coupled between a disk drive controller processor and the disk drive. The disk drive parameter storage section contains a set of control registers and a (format option) random access memory which may be written to and read by the control processor and serves to store drive control codes that are selectively coupled over a first of the set of associated data buses for application to the disk drive parameter comparator/interface section. The disk drive parameter comparator/interface section contains multiplexer and format conversion circuitry for interfacing data between the disk, storage/buffer components of the bus architecture itself, and the control processor. This section also contains comparator and auxiliary storage circuitry coupled with a second of the set of associated data buses, for comparing data read from the disk with parameter data stored in and selectively accessed from the disk drive parameter storage section.

6 Claims, 3 Drawing Sheets

DIGITAL DATA BUS ARCHITECTURE FOR COMPUTER DISK DRIVE CONTROLLER

FIELD OF THE INVENTION

The present invention relates in general to data processing systems and is particularly directed to a digital data bus architecture for interfacing a disk drive with its associated disk drive controller.

BACKGROUND OF THE INVENTION

For escalating growth of data processing technology has seen the introduction of a wide variety of data storage and and retrieval structures and associated signaling formats which exploit the capabilities of these system building blocks. In a data processing system, such as a small computer system, interfacing the computer with an attendant storage facility (e.g., magnetic disk) is effected by way of a (Winchester) disk drive and an associated controller, typically uniquely configured in accordance with signal processing parameters associated with the drive mechanism and its attendant processor. Because the design of an associated controller is customarily tailored to handle, or dedicated to, a particular type or class of data/signal communication/storage characteristics of associated storage and data processing equipments, there is currently no effective mechanism that enjoys a broad spectrum or universal adaptability to the wide variety of performance levels and signaling formats embodied in today's storage media and their associated drive units.

SUMMARY OF THE INVENTION

In accordance with the present invention, the limited interface/control capabilities of conventional disk drive controller mechanisms are obviated by a new and improved disk drive controller bus architecture that enables the controller to be interfaced with disk drives having widely varying data format requirements in a configuration that is user-programmable and implementable on a single semiconductor chip. Pursuant to the present invention, the bus architecture comprises a disk drive parameter storage section, a disk drive parameter comparator/interface section and a set of associated data buses, coupled between a disk drive control processor and the disk drive. The disk drive parameter storage section is comprised of a set of control registers and a (format option) random access memory which may be written to and read by the control processor and serve to store drive control codes that are selectively coupled over a first of the set of associated data buses for application to the disk drive parameter comparator/interface section. The disk drive parameter comparator/interface section contains multiplexer and format conversion circuitry for interfacing data between the disk, storage/buffer components of the bus architecture itself, and the control processor. This section contains comparator and auxiliary storage circuitry, coupled with a second of the set of associated data buses, for comparing data read from the disk with parameter data stored in and selectively accessed from the disk drive parameter storage section.

The combination of data storage/modification and interface components of the architecture of the disk drive interface according to the present invention enables substantially any type of small computer system to interface with effectively any type of disk drive, regardless of disk parameter definitions and signal formats. Any data on the disk may be interfaced with, used to control, or be modified by system parameter data from the control processor by reading the data from the disk via the disk data parameter interface/comparator section and either operating on the data by transfer to the control processor, or comparing actual performance data with predefined control parameters. The operation of the disk drive will, of course, depend on the format parameters established by the system user, resident in an attendant control store, and is not limited to any specific sequence of events.

DETAILED DESCRIPTION

Figure 1:
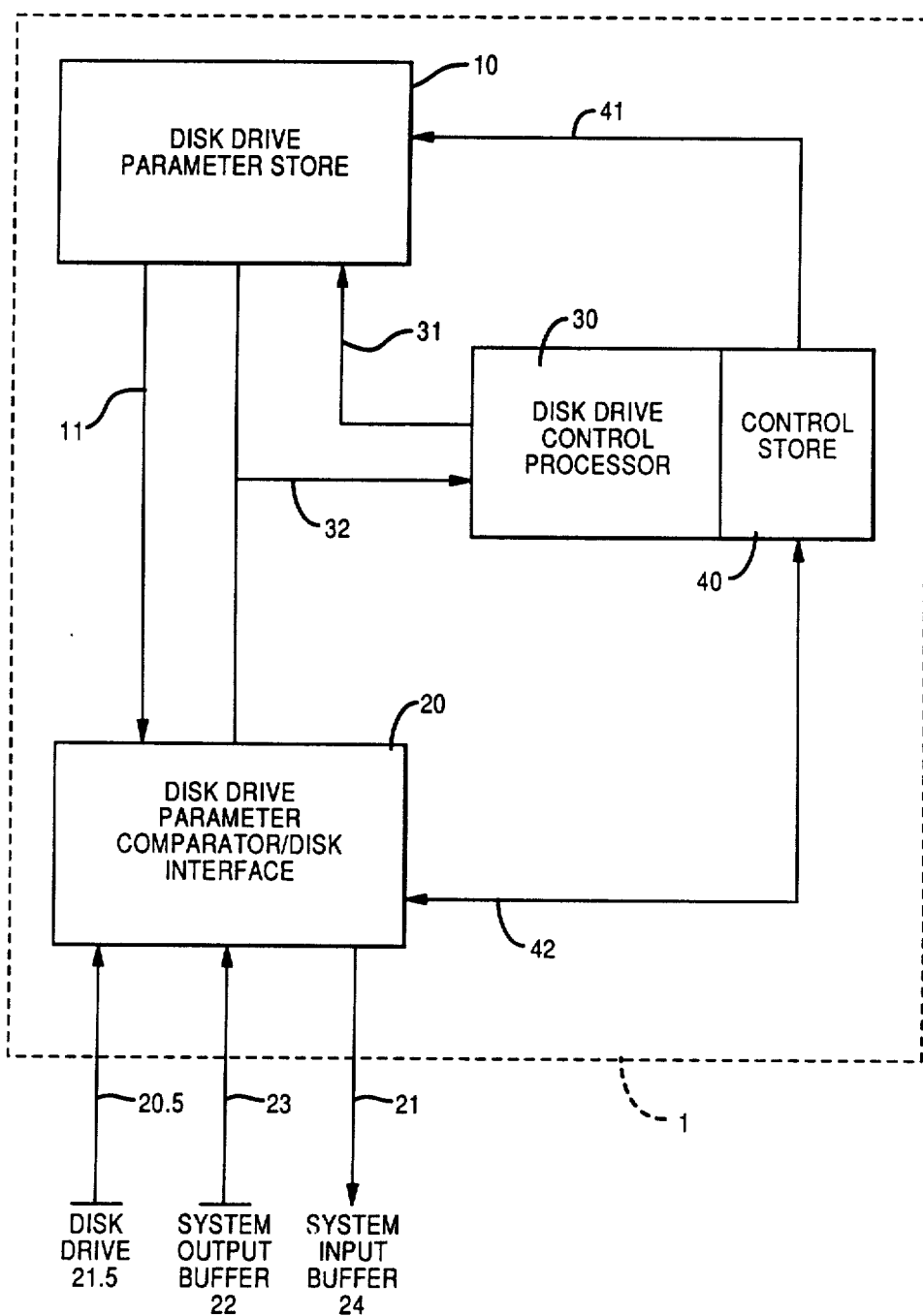
FIG. 1 is a block diagram of a digital data bus architecture for a computer disk drive controller in accordance with the present invention.

Before describing in detail the particular improved data bus architecture for a computer disk drive controller in accordance with the present invention, it should be observed that the present invention resides primarily in a novel structural combination of conventional data processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of these figures do not necessarily represent the mechanical structural arrangement of the exemplary system, but are primarily intended to illustrate the major structural components of the system in a convenient functional grouping, whereby the present invention may be more readily understood.

Referring now to FIG. 1, a block diagram of a digital data bus architecture for a computer disk drive controller 1 in accordance with the present invention is shown as comprising a disk drive parameter storage section 10 and a disk drive parameter comparator/disk interface section 20. The disk drive parameter storage section 10 and comparator/disk interface section 20 are coupled to a disk drive control processor 30 by way of a and a processor input data bus 32. A processor output data bus 31 is also connected between the disk drive parameter storage section 10 and the disk drive control processor 30. It is through data buses 31 and 32 that the disk drive control processor 30 interfaces control parameter data with the bus architecture of the present invention for controlling the operation of the disk drive. Disk drive parameter storage section 10 and comparator/disk interface section 20 are also coupled via links 41 and 42 respectively to a control store 40 (a programmable read only memory or PROM and control logic), in which a user defined disk drive operation control program is stored, for interfacing therewith control and esponse signals for sequencing through the operation of the disk drive controller.

Figure 2:
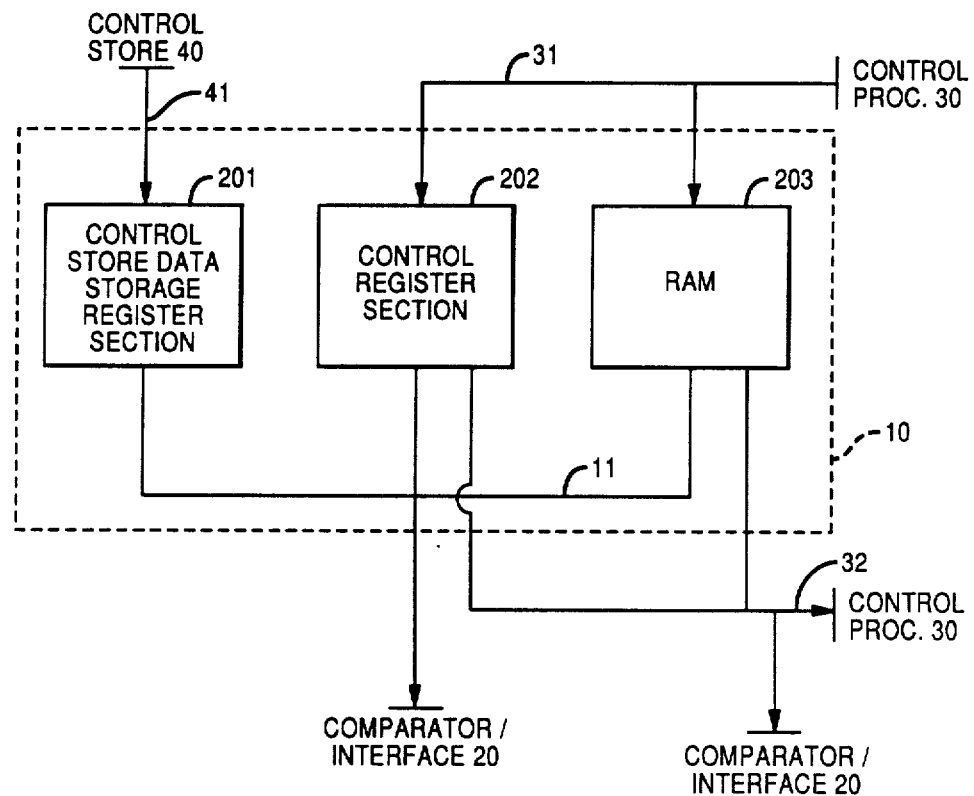
FIG. 2 is a diagrammatical illustration of parameter data storage section 10 of the architecture shown in FIG. 1.

Disk drive parameter storage section 10, to be decribed later in more detail with reference to FIG. 2, contains a set of control registers and a (format option) memory which store disk drive control codes (parameters) input by the user that are selectively coupled over a first digital data bus 11 for application to disk drive parameter comparator/interface section 20. Disk drive parameter comparator/disk interface section 20, to be lescrived later in more detail with reference to FIG. 3, contains serial-parallel, parallel-serial interface circuitry or interfacing data between the disk 21.5 (serial format) and control processor 30 (parallel format). This section also contains comparator circuitry, and auxiliary storage circuitry, for comparing blocks of data, such as data read from the disk 21.5 with parameter data stored in and selectively accessed from parameter storage section 10. In addition, interface/comparator section 20 contains a data interface multiplexer for controllably coupling externally generated user data, or data placed on bus 11 from disk drive parameter storage section 10, directly to the disk drive for storage on the disk. The respective interface, comparator and auxiliary storage circuitry of section 20 are coupled to digital data buses 11 and 23 to facilitate multi-directional transfer of data between its comparator and auxiliary storage circuit(system input buffer 24 and system output buffer 22, respectively), and the disk 21.5 via a bus 20.5 and control processor 30. Also, the control store 40 selects (via line 42) the auxiliary storage device to have data compared (via bus 21) in the interface/comparator section 20.

Returning to FIG. 2, the parameter data storage section 10 has a control store data register section 201, a set of content-modifiable control registers included in a control register section 202 and a random access memory (RAM) 203, the contents of each of which are controllably transferable to digital data bus 11. Control store data storage register section 201 is comprised of one or more data registers coupled via link 41 to the PROM of the control store 40 for receiving user-definable control codes for controlling disk drive operations such as timing, byte synchronization, sector searches and data conversion. Control register section 202 contains a set of controllable counters and associated buffers, coupled between processor output bus 31 and digital data bus 11. Parameter data supplied from control processor 30 to control register section 202 includes disk drive operation data such as disk sector number and the number of disk sectors to be transferred during a read operation, and are controllably modified by incrementing or decrementing the contents of the counters. Parameter data storage section 10 also contains RAM 203 for storing format data such as data that control the length of the inter sector gaps on the disk, data indicative of the positioning of the heads over the correct cylinder (e.g. a sixteen bit cylinder address in two separate most significant bit (MSB) and least significant bit (LSB) bytes) data representative of inter sector gap length time out, head number, user-defined flag data (to be compared with the flag data during an ID search), index gap length, format write splice length, data sync, address mark length and time out, the length of phase lock loop sync fields, the value of the ID sync byte and the value of the phase lock loop sync byte. The contents of memory 203, when accessed by control processor 30, are placed on bus 11, so that they may be written to the disk, or compared with data read from the disk, by way of disk drive parameter comparator/disk interface section 20.

Figure 3:
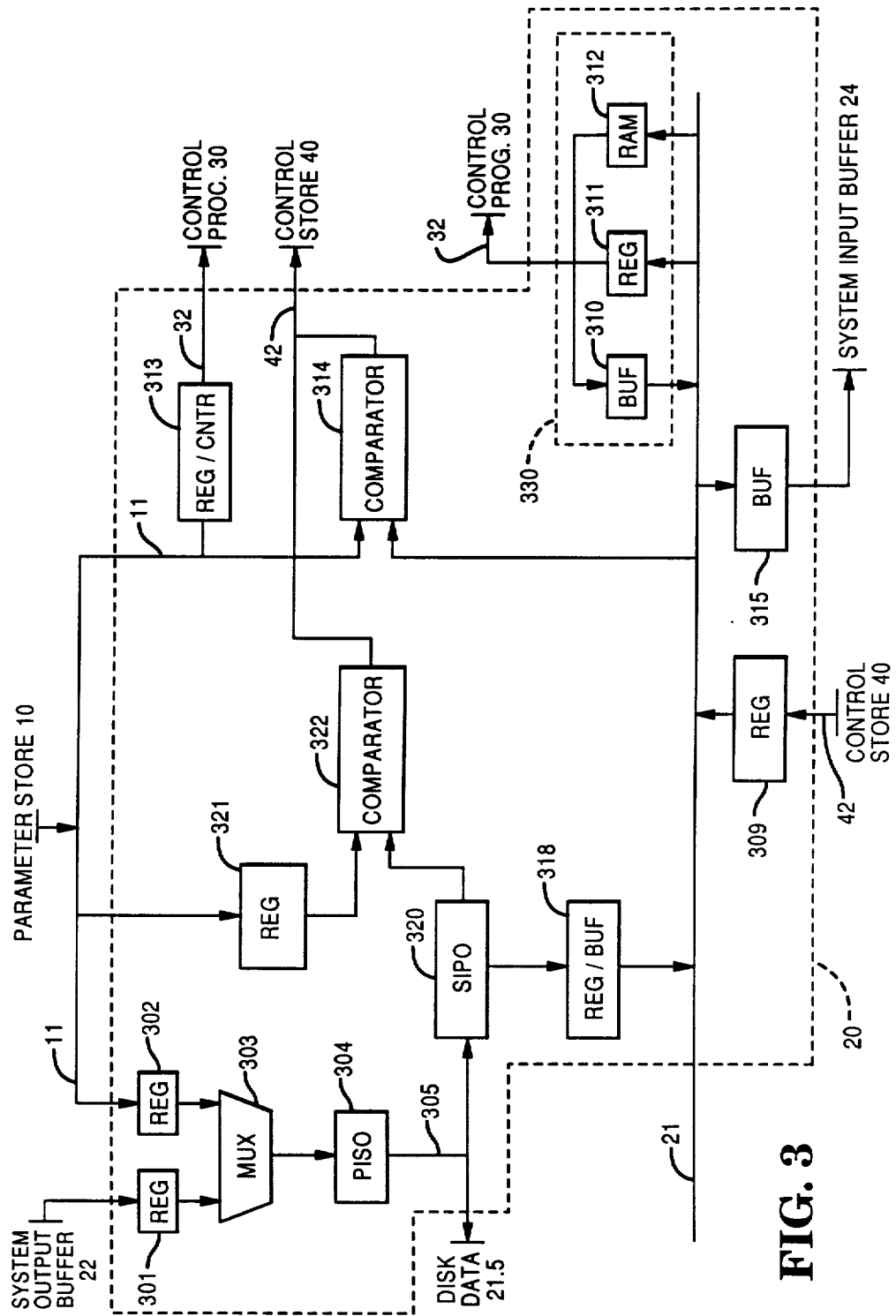
FIG. 3 diagrammatically shows the configuration of parameter interface/comparator section 20 of the architecture of FIG. 1.

Referring now to FIG. 3, the disk drive parameter comparator/interface section 20 comprises a pair of registers 301 and 302 the outputs of which are coupled to respective inputs of a multiplexer 303. The output of multiplexer 303 is coupled to a parallel-in, serial-out converter (PISO) 304, the output of which is coupled over a serial data link 305 to the disk drive. Input register 301 is coupled to a computer system data output buffer 22 which stores data generated by the computer system with which the disk drive is associated to be written to the disk, while register 302 is coupled to data bus 11 for receiving parameter data accessed from parameter storage section 10 to be written to the disk.

Disk drive parameter comparator/interface section 20 further includes a pair of comparators 322 and 314 whose outpus are coupled over link 42 to control store 40. Comparator 322 is dedicated to compare data read from the disk with selected parameter data accessed from parameter data storage section 10. Comparator 314 is coupled to each of data buses 11 and 21 for comparing any data that can be placed on these two buses with one another. The outputs of the comparators 314 and 322 are used by the control logic of the control store 40 to determine the next location in the PROM where an instruction is to be obtained.

More particularly, comparator 322 has a first input coupled to the output of a serial-in, parallel-out converter (SIPO) to which serial data supplied from the disk is coupled. As data is serially read out from the disk, it is converted into parallel format by converter 320 and stored in a register/buffer unit 318, to which bus 21 is coupled, so as to permit data read from the disk to be applied to the comparator 314 or read by control processor 30 by way of a buffer section 330 to which bus 32 is coupled. A second input of comparator 322 is coupled to a register 321 which is coupled to controllably receive data that is placed on bus 11. A second input of comparator 314 is coupled directly to bus 11, so that comparator 314 may compare directly whatever data is placed on respective buses 11 and 21. In effect, comparator 314 provides omnibus or universal parameter data comparison capability, since any of the parameter data stored in section 10 is transferable to bus 11, and any data that may be placed on bus 21 (including disk drive data via serial-to-parallel converter 320 and buffer 318) is applied to comparator 314. To permit comparison of any data stored in section 10 with data from control store 40, comparator/interface section 20 also contains a control store buffer 309, coupled to bus 21.

Comparator/interface section 20 further includes a register/counter 313, the input of which is coupled to bus 11 and the contents of which are transferable via the processor input bus 32 to the control processor 30. Through counter/register 313, any data placed on bus 11 may be selectively modified (incremented or decremented) and transferred (via input data bus 32) to the control processor 30. As noted above, to provide control processor 30 with the capability of reading the contents of bus 21, an auxiliary bus store 330, containing buffer 310, register 311 and random access memory 312, is coupled between bus 21 and processor bus 321. Register 311 is coupled to store data, such as flag data that has been read from the disk by way of serial-to-parallel converter 320 and coupled, on the fly, via register/buffer 318 to bus 21 and stored in register 311 for later use (e.g., flag data check via comparator 314). The data stored in register 311 may be placed on bus 21 through buffer 310 and thereby coupled to comparator 314. Memory 312, like memory 203 in parameter storage section 10 described above, is of a larger capacity than an individual register and is intended to store multiple parameter data that is placed on bus 21 for access by control processor 30 via input bus 32. Finally, comparator/interface section 20 includes an output buffer 315 to enable data placed on bus 21 to be transferred to a computer system input data buffer 24 which stores data processed/interface through section 20 for use by the computer system with which the disk drive is associated.

By virtue of the architecture of the disk drive interface, according to the present invention, there is provided an extremely versatile combination of data storage modification and interface components which enable substantially any type of small computer system to interface with effectively any type of disk drive, regardless of disk parameter definitions and signal formats. Any data on the disk may be interfaced with, used to control, or be modified by system parameter data from the control processor by reading the data from the disk via parameter interface/comparator section 20 and either operating on the data by transferring it to control processor 30 via bus 32 and store 330, or comparing, in comparator/interface section 20, actual disk operation data with predefined control parameters. The operation of the disk drive will, of course, depend on the format parameters established by the system user, resident in the control store and is not limited to any specific sequence of events. To illustrate the wide range of control provided by the present invention, consider the following examples of data interface functions that are capable of being carried out by the architecture of the present invention.

As pointed out above, random access memory 203 stores a prescribed number of (e.g. twelve) control parameters (in eight bit bytes) supplied by control processor 30 via its output bus 31. Nonlimitative examples of such processor-based control parameters include data that control the length of the inter sector gaps on the disk, data indicative of the positioning of the heads over the correct cylinder (a sixteen bit cylinder address in two separate (MSB and LSB) bytes, data representative of inter sector gap length time out, head number, user-defined flag data (to be compared with the flag during an ID search), index gap length, format write splice length, data sync, address mark length and time out, the length of phase lock loop sync fields, the value of the ID sync byte and the value of the phase lock loop sync byte. Examples of parameters stored by control registers 202 include data representative of the current sector number to be used in an ID search (read, write, etc.) and "sector count" data representative of the number of sectors to be transferred in a multisector transfer. The contents of control store register section 201 may include operational sequence control data and literal (raw) data.

With each of register sections 201 and 202 storing a pair of respective parameters and with memory 203 storing twelve control parameters (such as those listed above), it can be seen that disk drive parameter storage section 10 is capable of selectively placing on bus 11 any one of sixteen parameters, each of which can contain any eight-bit value in any sequence as defined by the user. In order to determine which any selected parameter contained in parameter storage section 10 is equal to data read from the disk it is simply a matter of placing on bus 11 the selected parameter accessed from parameter storage section 10 so that it may be applied directly to comparator 314, or through register 321 to comparator 322, and by reading the disk through serial-to-parallel converter 320 through register/buffer 318 onto bus 21 for application to comparator 314, or from converter 320 directly to comparator 322. For example, this selective access and comparison capability allows sector identification in a data search during a disk read.

In addition, as noted previously, the intercoupling of comparator 314 directly to each of buses 11 and 21 enables any parameter data that is loaded onto bus 11 to be compared with any of the parameters that is placed on bus 21. By providing control store input storage registers for each of buses 11 and 21, section 20 can be used to compare any control store data with any other (e.g., processor generated) data.

As will be appreciated from the foregoing description, the versatility of the architecture of the disk drive interface according to the present invention enables substantially any type of small computer system to interface with effectively any type of disk drive, regardless of disk parameter definitions and signal formats. Disk data may be interfaced with, used to control, or be modified by system parameter data by reading the data from the disk via the disk data parameter interface/comparator section and either operating on the data by transfer to the control processor, or comparing actual performance data with predefined control parameters.

While we have shown and described an embodiment in accordance with the present invention, it is to be understood that the same is not limited thereto but is susceptible to numerous changes and modifications, as known to a person skilled in the art, and we therefore do not wish to be limited to the details shown and described herein, but intend to cover all such changes and modifications as are obvious to one of ordinary skill in the art.

What is claimed:

1. A computer disk drive controller for controlling disk drives having varied data format requirements comprising:

a disk drive parameter store for storing user-defined disk drive parameters, said disk drive parameter store allowing a first level of user programming;

a disk drive parameter comparator/disk interface coupled to said disk drive parameter store via a first data bus, and coupled to a disk drive driving a disk via a second data bus, for comparing data from said disk to parameters from said disk drive parameter store;

a disk drive control processor coupled to said disk drive parameter store, said disk drive parameter comparator/disk interface, said disk drive and a control store, for performing programs stored in said control store in response to parameters received from said disk drive parameter store or said control store, to control said disk drive; and said control store comprising memory and control logic, and coupled to said disk drive parameter store and said disk drive parameter comparator/disk interface allowing for a second level of user programming, wherein a user created program in said memory is responsive to output signals from said disk drive parameter comparator/disk interface and the user created program in said memory determines the use and interpretation of the parameters stored by the disk drive parameter store.

2. The computer disk drive controller in claim 1 wherein said disk drive parameter comparator/disk interface comprises circuitry for interfacing serially formatted disk data to parallel format for said disk drive control processor, and for interfacing parallel format data from said disk drive control processor to serial format for said disk.

3. The computer disk drive controller in claim 2 wherein said disk drive parameter comparator disk interface further comprises circuitry for controllably coupling data received from said disk drive parameter store directly to said disk drive for storage onto said disk.

4. The computer disk drive controller in claim 3 wherein said disk drive parameter store comprises:
- a random access memory controllably coupled to said first data bus for storing a plurality of modifiable signals from said disk drive control processor representative of control parameters for controlling the operation of said disk drive as generated by said disk drive control processor;
- means controllably coupled to said first bus for storing modifiable signals from said disk drive control processor representative of control parameters for controlling the operation of said disk drive; and
- a plurality of interface buffer means for interfacing signals from said control store representative of user-defined control parameters to said first data bus for controlling the operation of said disk drive.

5. The computer disk drive controller in claim 2 wherein said disk drive parameter store comprises:
- a random access memory controllably coupled to said first data bus for storing a plurality of modifiable signals from said disk drive control processor representative of control parameters for controlling the operation of said disk drive as generated by said disk drive control processor;
- means controllably coupled to said first bus for storing modifiable signals from said disk drive control processor representative of control parameters for controlling the operation of said disk drive; and
- a plurality of interface buffer means for interfacing signals from said control store representative of user-defined control parameters to said first data bus for controlling the operation of said disk drive.

6. The computer disk drive controller in claim 1 wherein said disk drive parameter store comprises:
- a random access memory controllably coupled to said first data bus for storing a plurality of modifiable signals from said disk drive control processor representative of control parameters for controlling the operation of said disk drive as generated by said disk drive control processor;
- means controllably coupled to said first bus for storing modifiable signals from said disk drive control processor representative of control parameters for controlling the operation of said disk drive; and
- a plurality of interface buffer means for interfacing signals from said control store representative of user-defined control parameters to said first data bus for controlling the operation of said disk drive.

* * * * *